Sept. 10, 1935.  L. S. WILLIAMS  2,013,939
WEIGHING SCALE
Filed Aug. 9, 1933  4 Sheets-Sheet 1
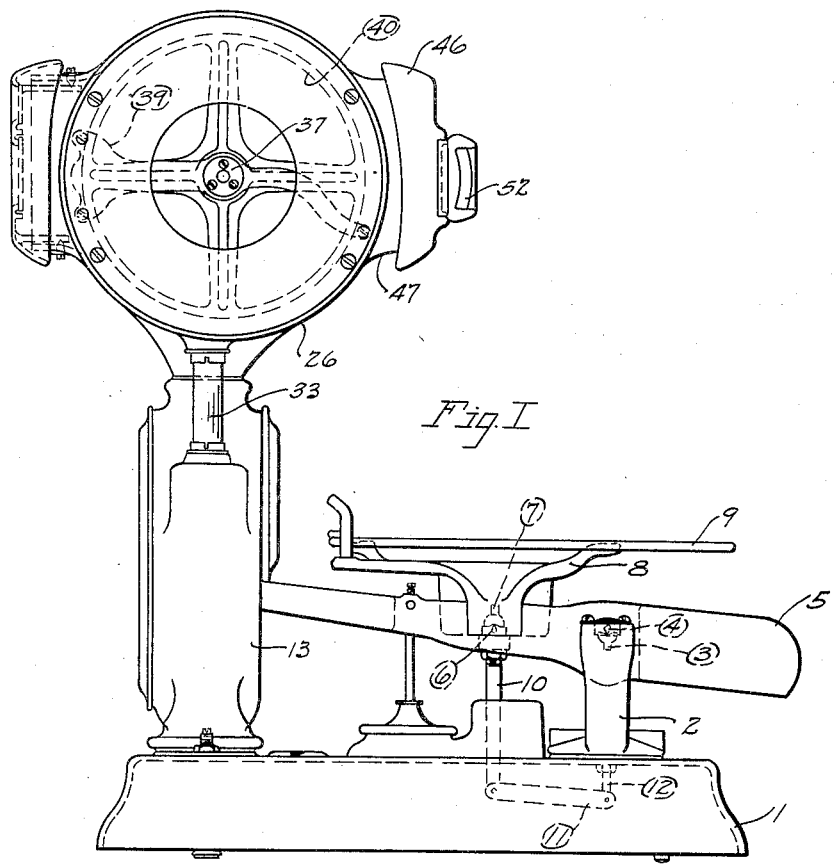
Fig. I
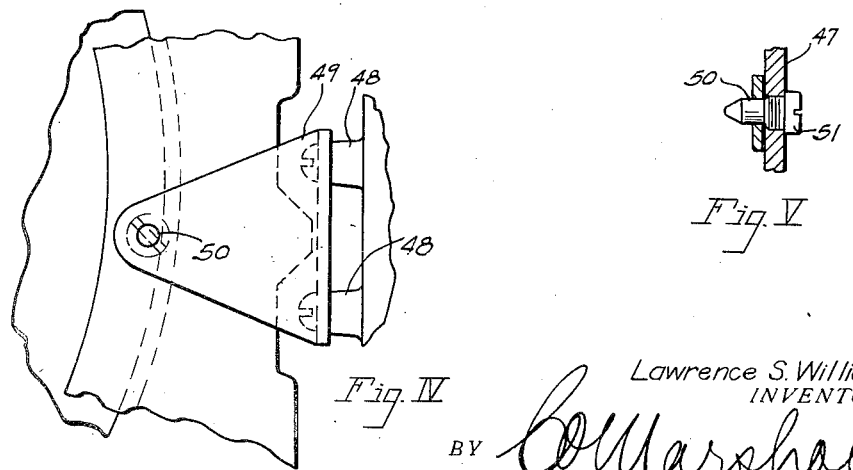
Fig. IV
Fig. V
Lawrence S. Williams
INVENTOR
BY C. O. Marshall
ATTORNEY

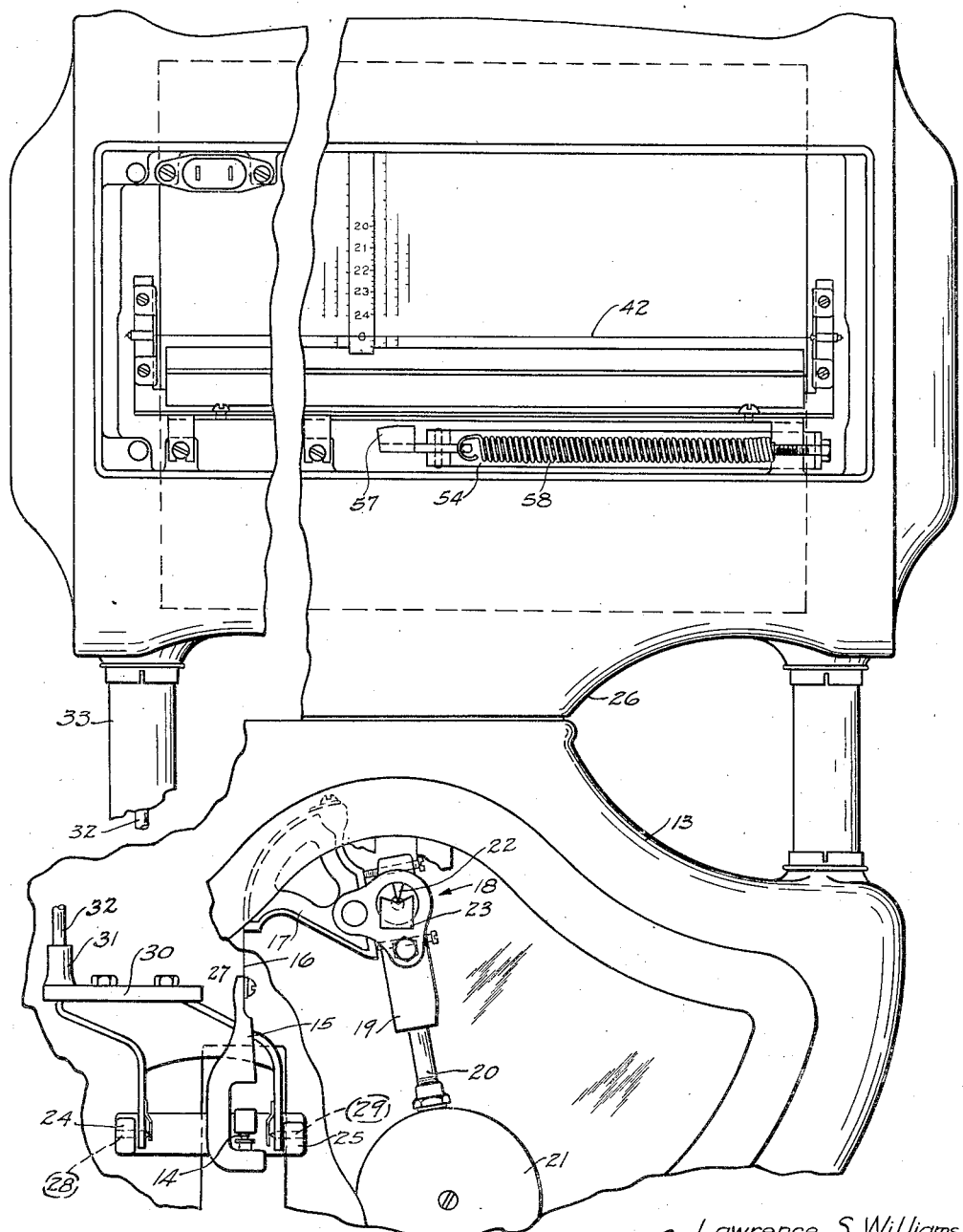

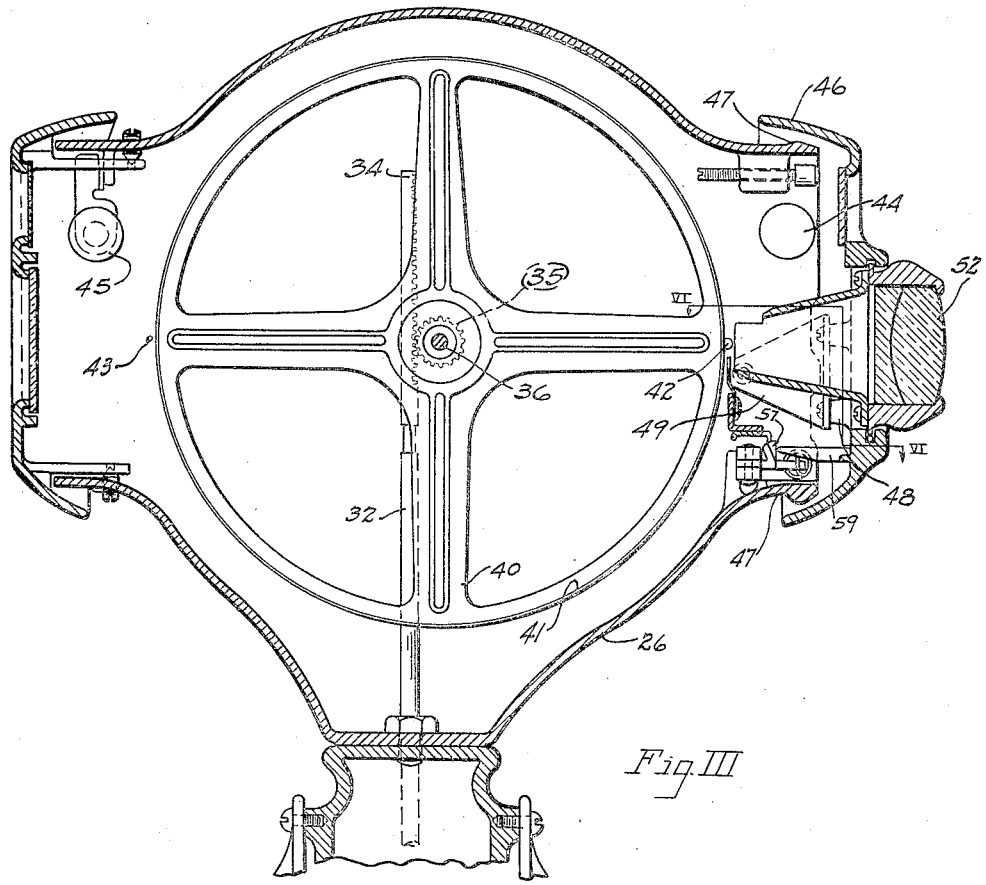
Fig. III
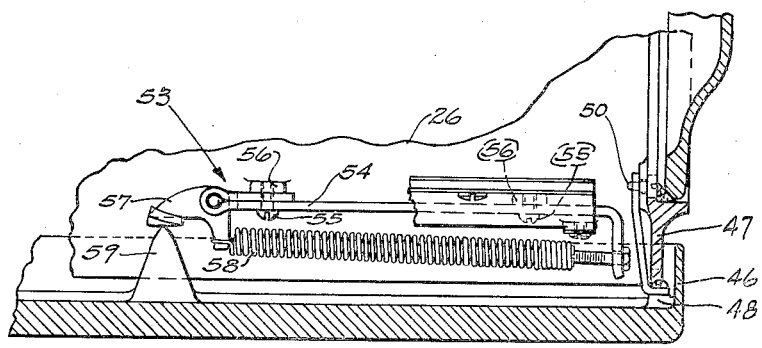
Fig. VI

Sept. 10, 1935.　　　L. S. WILLIAMS　　　2,013,939
WEIGHING SCALE
Filed Aug. 9, 1933　　　4 Sheets-Sheet 4
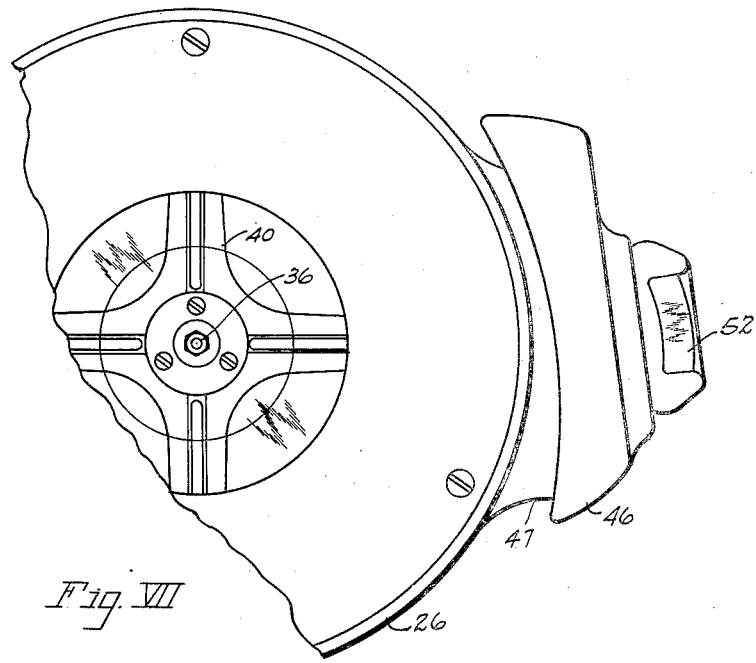
Fig. VII
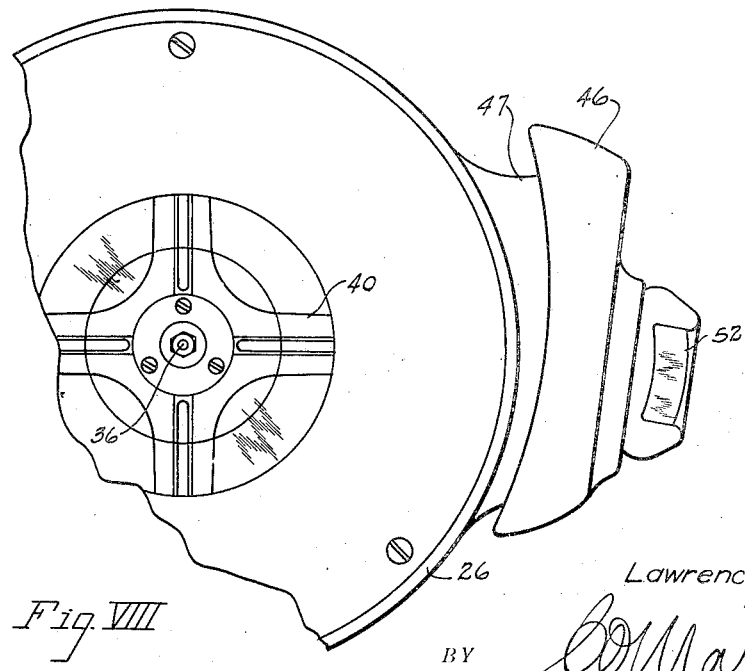
Fig. VIII
Lawrence S. Williams
INVENTOR
BY
ATTORNEY Patented Sept. 10, 1935

2,013,939

UNITED STATES PATENT OFFICE 2,013,939

WEIGHING SCALE

Lawrence S. Williams, Toledo, Ohio, assignor to Toledo Scale Manufacturing Company, Toledo, Ohio, a corporation of New Jersey Application August 9, 1933, Serial No. 684,413

8 Claims. (Cl. 116—129)

This invention relates generally to weighing scales and particularly to improvements to cylinder weighing scales widely employed in retail food shops. Th principal object of the invention is the provision of improved means whereby the indication of such scales may be read by tall or short persons with equal facility and accuracy.

Another object is the provision of an indicating frame which is adjustable about an axis lying in the vicinity of the chart surface and parallel to its longitudinal axis.

A further object is the provision of improved means for counterbalancing an adjustable indicating frame in any position within the limits of its adjustment.

These and other objects and advantages will be apparent from the following description in which reference is had to the accompanying drawings illustrating a preferred embodiment of my invention and in which similar reference numerals refer to similar parts throughout the several views.

Referring to the drawings:

Figure I is a side elevational view of a well known type of scale embodying my invention.

Figure II is an enlarged fragmentary view of the counterbalancing mechanism housing and the indicator casing, parts being broken away.

Figure III is an enlarged cross sectional view through the indicator casing, the lens frame being positioned suitably for an operator of average height.

Figure IV is an enlarged fragmentary side elevational view showing in detail a means for hinging the lens frame.

Figure V is a more detailed view of the hinge employed.

Figure VI is a plan view of the lens frame counterbalance taken on the line VI—VI of Figure III; and Figures VII and VIII respectively show the position of the lens frame suitably adjusted for operators taller or shorter than the average.

Since the scale to which I have shown my invention attached is widely known, I will describe it hereinafter only so far as is necessary to completely disclose my invention.

Referring to the drawings in detail:

The scale comprises a base 1 supporting near one of its ends a two armed bracket or base horn 2. The upper ends of the arms of this base horn are provided with bearings 3 upon which are mounted a pair of fulcrum pivots 4 projecting from a load supporting lever 5. This lever is a rigid iron casting and in addition to the pivots 4 is provided with a pair of load pivots 6 which are engaged by bearings 7 fixed in a load platter spider 8. A platter 9 secured to the spider 8 serves as a receptacle for the commodities to be weighed. To maintain the condition of level of the load platter 9 a downwardly extending stem 10 threaded into the spider, projects through an opening into the hollow interior of the base 1, its ends pivotally engaging one end of a check link 11 whose other end is similarly engaged by a so-called shift post 12 adjustably mounted in the base. One end of the lever 5 extends through an opening into the interior of a housing 13 securely bolted to the opposite end of the base.

For the purpose of operatively connecting the lever 5 and the thereupon supported load to a counterbalancing mechanism and indicating means, the portion of the lever 5 extending into the housing 13 is provided with a nose in which a power pivot 14 is fixed. This pivot engages a suitable bearing in a stirrup 15 suspended from the lower end of a flexible metallic tape 16, the upper end of which overlies and is fastened to the arcuate face of a rectifying cam 17 adjustably secured to a pendulum 18 which in addition to the cam referred to comprises a body 19 into which a stem 20 is studded. To attain the desired load counterbalancing effect, a pendulum weight 21 is adjustably threaded on this stem. The oscillatable mounting of the pendulum is accomplished by a pivot 22 extending through the body 19 and resting in V bearings 23 held in integral brackets (not shown) extending from the walls of the housing. Extending laterally, adjacent the lever nose are two arms 24 and 25. For the purpose of transmitting movement to the indicating means which are situated in a chart casing 26 surmounting the housing 13, a rack foot 27 is seated upon colinear pintles 28 and 29 extending horizontally from the arms 24 and 25 of the lever 5 substantially in the vertical plane passing through the vertex of the pivot 14. A plate 30, adjustably fastened to the rack foot 27, is provided with a boss 31 in which a rack rod 32 is clamped. This rack rod extends upwardly through a protector tube 33 into the casing 26. Teeth of a rack 34, fixed in the upper end of the rod 32, engage the teeth of a chart drive pinion 35 (Fig. III) which encompasses and is pinned to a chart shaft 36, the ends of which are supported in ball bearings 37 mounted in brackets 39 extending across the open ends of the casing 26. For the purpose of supporting a weight and value indicating chart a plurality of light spider-like circular frames 40 are fastened in spaced relation to each other on the shaft 36 and surrounded by a cylinder 41 made from very thin and light metal on which the weight and value indicia are printed. Since this light cylinder is very rigid and has a high degree of concentricity, an index line 42 comprising a very thin thread or wire may be stretched in front of the chart in very close proximity to its surface for the purpose of indicating to the merchant the proper weight and value indicia to be read. It has been found that the clearance between the chart and line need only be .010". This results in an indication which is free from errors due to parallax. A similar index 43 is usually stretched across the opposite face of the chart to indicate the weight of the commodity to the customer.

As it is customary in scales of this type an in-built illuminating arrangement is provided. This comprises lamps 44 on the merchant's and lamps 45 on the customer's side of the scale. These are connected by a suitable system of wiring to an electric make and break switch (not shown) which is opened and/or closed by the movement of a scale part in the usual manner.

The mode of operation of a scale of the type described is so widely known that a short description will suffice to explain it. When a load is placed on the platform 9, gravity acting thereon causes the lever 5 to be turned about its fulcrum pivot and the lever nose pivot transmits a proportional portion of this force to the stirrup 15 which in turn transmits this force through the ribbon 16 to the counterbalancing pendulum 18. This, by the application of the force, turns on its pivot 22 outwardly and upwardly until its weight moment is sufficient to counterbalance the weight moment of the load. Since the angular displacement is proportionate to the weight of such load, the downward movement of the lever is transmitted through the rack rod 32, the rack 34 to the pinion 35 which revolves the chart through an angle proportionate to the angle of movement of the pendulum and thus it is also proportionate to the weight of the load and indicia positioned appropriately on the chart cylinder 41, accurately indicates such weight and the completed value, by the cooperation of the indexes 42 and 43.

Scales of the type described are usually equipped with means to magnify the indication. This is usually accomplished by placing a single cylindrical lens having a length equal to the width of the chart, in front of such chart or a plurality of spherical lenses whose combined length is equal to the width of the chart. Although the construction of the indicating means is such as hereinbefore described to obviate errors which are due to parallax in reading the weight and value indication, such indication, however, is distorted to some extent by the magnifying lens unless the observer's eyes are positioned substantially at right angles to the plane of the lens. Since scales are usually placed so that the indication is suitable for an operator of average height in order to view the indication to the best advantage operators who are taller or shorter must either stoop or stand on tip toe. To eliminate these objections, I provide on the merchant's side a lens holding frame 46 which may be adjusted to suit observers of varying heights. The casing 26 for this purpose is provided with protruding flanges 47 which define a rectangular opening and the frame 46 is designed with comparatively deep sides which freely surround the flanges 47 and at each end is provided with two bosses 48 to which triangular hinge-like members 49 are bolted. These hinge-like members project inwardly and at their apexes are provided with openings into which tenons 50 of colinearly disposed screws 51 extend. These screws are threaded through portions of the end flanges 47 of the casing 26. It will be seen that this construction permits the frame 46 in which a compound lens 52 is stationed to be adjusted about the axis of the screws 51 (see Figs. VII and VIII). However, since the frame is overbalanced it would always rest against the bottom flange 47. To counterbalance this overbalancing force, I mount on the bottom flange 47 in the interior of the opening a counterbalancing assembly 53. The assembly comprises a formed sheet metal bracket-like member 54 secured by screws 55 to bosses 56 projecting upwardly from the lower flange 47 of the casing 26. To one end of this member 54 which projects beyond the bosses 56, a crank-like contact member 57 is rotatably fastened. The opposite end of the member 54 is turned outwardly and forms an anchor for a tension coil 58. A loop formed on the other end of the tension coil engages an angularly extending arm of the contact member 57. For the purpose of engaging the contact member 57, the lens frame 46 has an inwardly projecting extension or finger 59.

When a tall operator desires to read the scale, he turns the lens frame 46 upwardly substantially to the position shown in Figure VII. This retracts the finger 59 and allows the tension coil 58 to contract. When a short operator desires to use the scale, in the similar manner he turns the lens frame downwardly as shown in Figure VIII. This causes the projection or finger 59 to press against the contact member 57 turning it about its fulcrum and to extend the coil. The coil being proportioned so that in each case, either in the extended or contracted position, it substantially counterbalances the force exerted by the lens frame.

It will be seen that the embodiment of my invention herein illustrated and described is well adapted to fulfill the objects primarily stated. It is to be understood, however, that the invention is susceptible to variation, modification, and change within the spirit and scope of the subjoined claims.

Having described my invention, I claim:

1. In a device of the class described, in combination, weighing mechanism, automatic indicating means operatively connected thereto, said indicating means including a chart having indicia, housing means for said weighing mechanism and said indicating means, means for magnifying said indicia, said magnifying means comprising a frame, a magnifying lens carried by said frame, means including a hinge at each end of said frame for attaching said frame to said housing means, whereby said frame is tiltable selectively to positions in which lines of sight of observers of different heights pass through said lens at an angle substantially perpendicular to its major plane, and means for yieldably holding said frame in selected position.

2. In a device of the class described, in combination, weighing mechanism, automatic indicating means operatively connected thereto, said indicating means including a chart having indicia, housing means for said weighing mechanism and said indicating means, means for magnifying said indicia, said magnifying means comprising a frame, a magnifying lens carried by said frame, means including a hinge at each end of said frame for attaching said frame to said housing means whereby said frame is tiltable selectively to positions in which lines of sight of observers of different heights pass through said lens at an angle substantially perpendicular to its major plane, and means for counterbalancing said frame and holding it in tilted position.

3. In a device of the class described, in combination, weighing mechanism, automatic indicating means operatively connected thereto, said indicating means including a chart having indicia, housing means for said weighing mechanism and said indicating means, means for magnifying said indicia, said magnifying means comprising a frame, a magnifying lens carried by said frame, means including a hinge at each end of said frame for attaching said frame to said housing means whereby said frame is tiltable selectively to positions in which lines of sight of observers of different heights may pass through said lens at an angle substantially perpendicular to its major plane, means for counterbalancing said frame and holding it in tilted position, said counterbalancing and holding means comprising a tension coil adapted to be acted upon by forces of varying degree, and means connected to said frame and cooperating with means connected to said coil to vary the degree of such forces.

4. In a device of the class described, in combination, housing means containing a cylindrical indicia bearing chart, an index lying before said chart, a lens for magnifying a portion of the indicia on said chart lying directly back of said index and means for controlling the position of said lens whereby the major plane of said lens is settable at different angles with reference to a vertical plane tangent to the periphery of said cylindrical chart, said means for setting said lens comprising a substantially rectangular frame carrying said lens and having members at the ends thereof pivotally secured to said housing and resilient means adapted to exert forces to counterbalance the varying unbalanced weight of said rectangular frame when set at different angles to said chart.

5. In a device of the class described, in combination, a weighing scale comprising weighing mechanism and indicating means, housing members for said mechanism and means, said indicating means comprising a cylindrical indicia bearing chart rotatably mounted within one of said housing members, said housing member having a rectangular opening, flanges surrounding said opening, a frame, and a lens mounted in said frame, said frame being tiltably hinged to said housing member to cover said rectangular opening, the means for hinging said frame being secured thereto at points intermediate its upper and lower edge.

6. In a device of the class described, in combination, a weighing scale comprising weighing mechanism and indicating means, housing members for said mechanism and means, said indicating means comprising a cylindrical indicia bearing chart rotatably mounted within one of said housing members, said housing member having a rectangular opening, flanges surrounding said opening, a frame, and a lens mounted in said frame, said frame being tiltably hinged to said housing member to cover said rectangular opening, the hinging means being secured to said frame at points intermediate its upper and lower edge, said frame having sides adapted to overlap yet clear said flanges on said housing when said frame is tilted.

7. In a device of the class described, in combination, a housing having a rectangular opening, an indicia bearing chart rotatably mounted within said housing immediately back of said opening, an index line fixedly stretched in front of said chart, said opening being surrounded by outwardly directed horizontal and vertical flanges, a rectangular frame tiltably secured to said vertical flanges and a means secured to the lower of said horizontal flanges for holding said rectangular frame in tilted or normal position.

8. In a device of the class described, in combination, a housing having a rectangular opening, an indicia bearing chart rotatably mounted within said housing immediately back of said opening, an index line fixedly stretched in front of said chart, said opening being surrounded by outwardly directed horizontal and vertical flanges, a rectangular frame tiltably secured to said vertical flanges and a means secured to the lower of said horizontal flanges for holding said rectangular frame in tilted or normal position, said holding means comprising a bracket-like member fastened to the last mentioned flange, a pivoted bell-crank member, an extensible coil having one end secured to said bracket-like member, its other end being attached to one arm of said bell-crank member, and a finger like inwardly extending member for engagement with said other arm of said bell-crank member.

LAWRENCE S. WILLIAMS.